United States Patent [19]

Morton

[11] 4,177,601
[45] Dec. 11, 1979

[54] FLOATED BAG TRAP

[76] Inventor: Roger H. Morton, 314 Sand Dune La., Holden Beach, Brunswick County, N.C. 28462

[21] Appl. No.: 879,249

[22] Filed: Feb. 21, 1978

[51] Int. Cl.² ............................................ A01K 69/06
[52] U.S. Cl. ........................................ 43/102; 43/103
[58] Field of Search ................ 43/100, 101, 102, 103, 43/104, 105, 106, 55

[56] References Cited

U.S. PATENT DOCUMENTS

| | | | |
|---|---|---|---|
| 616,924 | 1/1899 | Heberling | 43/100 X |
| 636,381 | 11/1899 | Hamel | 43/100 X |
| 1,393,907 | 10/1921 | Reimer | 43/103 |
| 2,119,828 | 6/1938 | Nordenstam | 43/100 |
| 2,123,471 | 7/1938 | Lewis | 43/100 |
| 2,241,314 | 5/1941 | Mohler | 43/55 |
| 3,029,546 | 4/1962 | Ruiz | 43/105 |
| 3,300,890 | 1/1967 | Thomassen | 43/100 |
| 4,044,493 | 8/1977 | Fox | 43/105 |

FOREIGN PATENT DOCUMENTS 24222 12/1921 France ...................................... 43/103
11737 12/1900 Sweden ...................................... 43/102

OTHER PUBLICATIONS

World Fishing, Sep., 1967, p. 37.

*Primary Examiner*—Harold D. Whitehead
*Assistant Examiner*—K. Bradford Adolphson
*Attorney, Agent, or Firm*—Bell, Seltzer, Park & Gibson

[57] ABSTRACT

A trap for fish, crabs and the like, characterized by a substantial portion thereof being flexible and collapsible for increasing capacity while facilitating storage, safety and handling. The trap comprises an enclosure defined by a large flexible net secured to and communicating with a smaller and substantially rigid base carrying a bait well. Affixed to the net is flotation means whereby the net expands upwardly while under water increasing capacity while properly aligning the base on the underwater floor. Means are provided in the enclosure for baiting the bait well, for entrance of fish, crabs and the like and for emptying the trap. Location and retrieval means are affixed to the trap for retrieval, preferably base first.

2 Claims, 4 Drawing Figures

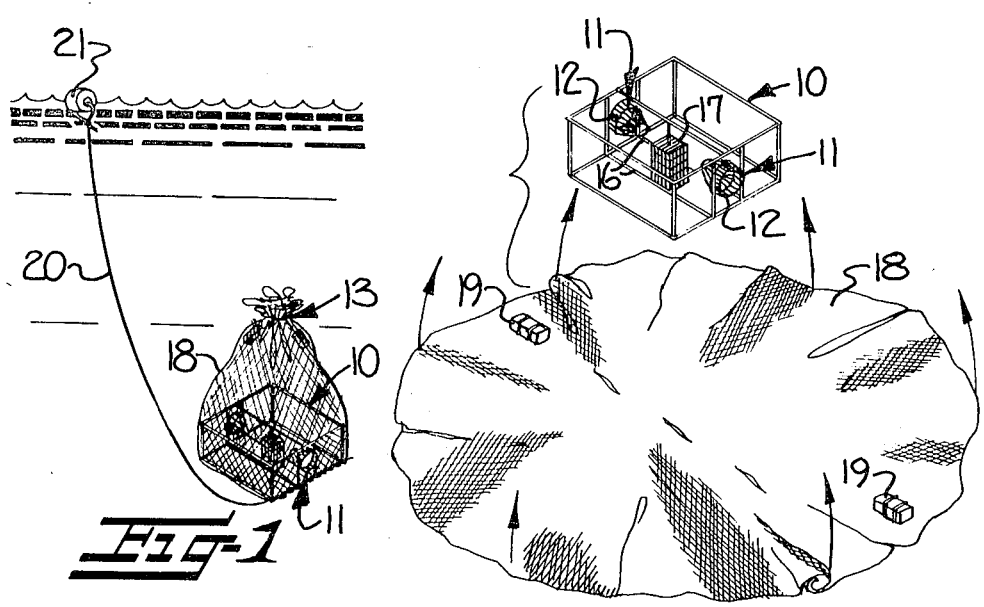
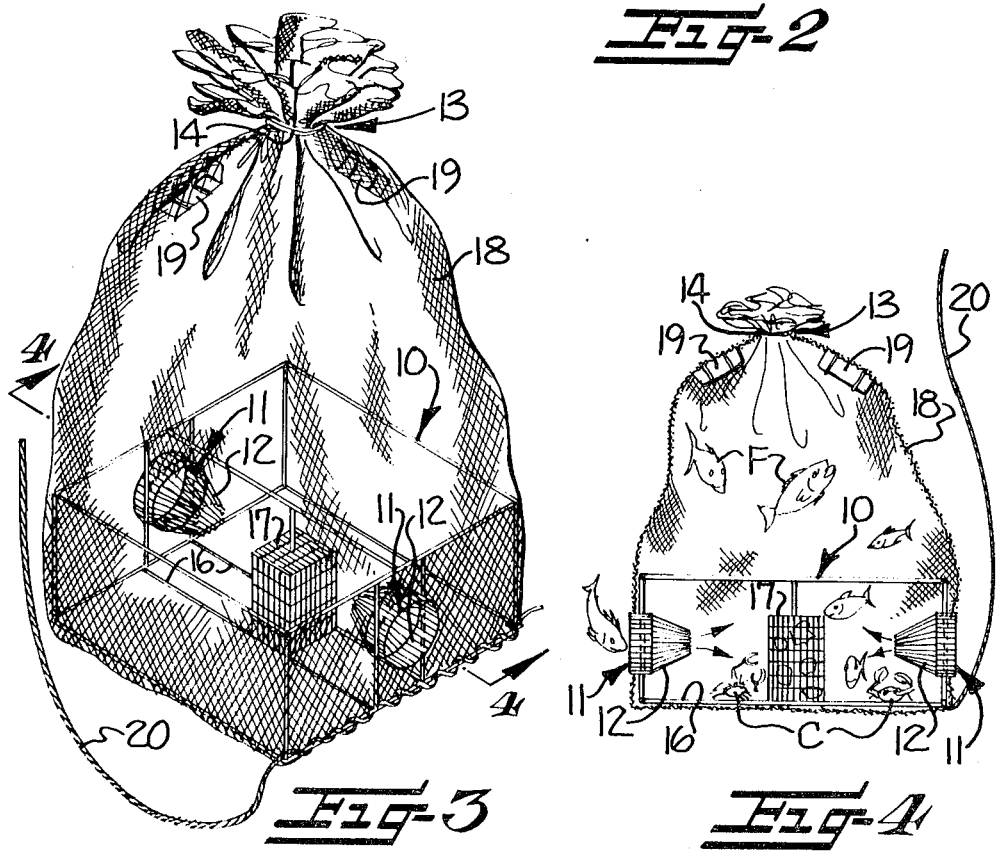

:

FLOATED BAG TRAP

BACKGROUND OF THE INVENTION

1. Field of the Invention

This invention is related to the field of traps for fish, crabs and the like, more particularly to collapsible traps which can be left under water and later retrieved.

2. Description of the Prior Art

Conventional fishing traps carried by commercial fishing boats are generally constructed virtually completely of steel, wire, or other rigid or semi-rigid materials and typically have a capacity of approximately 60 to 70 pounds of fish per trap. If capacity could be increased without simultaneously increasing storage and handling problems, substantial economies might be realized. Specifically, a larger trap could be left under water for a longer period of time, thus reducing the labor and other costs associated with periodic patrolling, emptying and redeployment. Additionally, increasing the capacity of a trap should increase trap efficiency, since a greater portion of the time during which the trap would be in use would be devoted to actual trapping as opposed to patrolling, emptying and redeployment operations.

However, despite the foregoing potential advantages, efforts to employ larger conventional traps have not been entirely successful. In short, it has generally not been economical, efficient or practical substantially to increase the capacity of rigid traps. Among the reasons is the fact that the capacity of a conventional trap is necessarily limited by: (a) the relatively small size, deck and trap storage space of typical 25-35 foot commercial fishing boats, (b) the decrease in safety stemming from the use of larger, heavier rigid traps on such boats, particularly in rough water, and (c) the desirability of deploying as many traps as possible per available boat, thus increasing the chances of contacting at least some worthwhile schools of fish.

SUMMARY OF THE INVENTION

The present invention solves the foregoing problems. It represents, for the first time, a low-cost, safe, commercial fishing trap of substantially increased capacity while under water but which is largely collapsible when removed therefrom. As will be more apparent from the attached drawings, the trap comprises a substantially rigid base adapted to rest on an underwater floor. Secured to and communicatively cooperating with the base to form a trapping enclosure of substantially greater volume than that defined by the base is a flexible enclosure means which preferably comprises a flexible net and flotation means secured thereto. A bait well is carried by the base by any suitable means and means is provided in the enclosure for baiting the well. Entry means, preferably including a cylindroconical muzzle secured to the base adjacent a hole in the net is provided in one or more sides of the trap preferably in line with the bait well. Also provided are location and retrieval means, which may comprise a line and a flotation buoy attached to the base, such that the trap may be retrieved base first, thus better dispersing the forces exerted on the trap during the course of retrieval. Access means for removing the catch, which may comprise a hole in the net reclosable in response to a line, are provided, preferably in the portion of the net opposite the base.

Through the use of this invention, the overall simultaneous trapping capacity per available boat can be increased by a ratio of approximately 3 to 1 over the aggregate simultaneous trapping capacity typically achieved by a boat of like size using conventional traps. Moreover, because the trap of this invention is substantially flexible and collapsible, the increase in capacity and the resulting economies and efficiencies it achieves are accomplished without substantial loss of deck and storage space, without substantially increasing safety hazards and without reducing the number of traps which can be carried on or deployed from any given boat. Indeed, by building collapsible traps as herein disclosed on a scale such that their trapping capacity is substantially equal to that of conventional traps typically in use today, the number of traps deployable per available boat can be substantially increased without detrimental safety, storage and handling consequences.

Surprisingly, tests have shown that the collapsible trap herein disclosed frequently catches 15-30 percent more fish than rigid conventional traps of similar capacity. While the reasons for this phenomenon are not understood, it is theorized that the flexibility of the enclosure means, which permits it to move and sway with actions of the fish trapped within, adds to the excitement of the fish feeding frenzy, thus progressively attracting still more fish.

BRIEF DESCRIPTION OF THE DRAWINGS

Some of the features of this invention having been stated, others will be apparent when taken in conjunction with the accompanying drawings, in which:

FIG. 1 is a perspective view of this invention while in underwater trapping condition;

FIG. 2 is an exploded view of the invention for clarity of details thereof;

FIG. 3 is an enlarged view of the invention, with parts broken away; and

FIG. 4 is a section view taken along line 4—4 in FIG. 3, showing the invention in trapping condition.

DETAILED DESCRIPTION OF INVENTION

Referring to the FIG. 1, the trap comprises a base generally indicated at 10, having four open sides, preferably square or rectangular in shape. Preferably centered in base 10 is bait well 17, which may be supported by conventional crossties 16. A conventional access door to bait well 17 is provided in the bottom of base 10 adjacent a hole in the bottom of the net under the base, which thus serves as a means for baiting the well.

Surrounding all sidewalls of base 10 and cooperating with said base to form an enclosure is flexible netting 18 attached to the upper portion of which is buoyancy means 19 of which there are preferably two arranged at 180 degree intervals within the upper inside portion of netting 18, as best illustrated in FIGS. 2 and 3. Buoyancy means 19 may comprise net floats chosen with respect to the weight of the net desired.

Advantageously, netting 18 is tightly secured to base 10 by means of an ordinary nylon rope or line (not shown). Catch removal means 13, which may comprise a hole closable in response to nylon rope 14, may be provided in the top of netting 18 whereby the catch may be removed without disassembling the trap. Also attached to the base is locating and retrieval means, indicated at 20 and 21, and comprising, respectively, a nylon line 20 and a buoy 21, best illustrated in FIGS. 1 and 3. Preferably, the length of line 20 should be roughly twice the depth of the water in question.

Fish entry means 11, best shown in FIGS. 3 and 4, comprises a hole in netting means 18, within the space defined by the side of base 10, and, preferably, a conventional cylindro-conical muzzle 12 the ends of which are aligned with the aforesaid holes by securing the muzzle to base 10 by attachment to crossties bridging medial portions of opposite sides of base 10. Advantageously, two entry means 11 are provided in opposite sides of base 10 and the hole in webbing 18 is circular and substantially matches the exterior hole in muzzle 12, as best illustrated in FIGS. 3 and 4. The aforesaid holes should be aligned preferably by securing netting 18 to muzzle 12 by means of one or more nylon ties (not shown).

Advantageously, the base, the muzzles and the bait well may be formed from high impact plastic having a specific gravity substantially greater than that of water. However, corrosion resistant and other metals, wire and fiberglass can be used. Satisfactory bases have been constructed from ⅜ inch to ⅝ inch steel rods subsequently treated with rust retardant paint. Bait well 17 and muzzle 12 may also be constructed of 1 inch by 2 inch welded wire, fiberglass or similar material. The dimensions of muzzle 12 may vary to some extent with the specific catch. For example, muzzles approximately 7⅜ inches in length and 6½ inches at the larger (exterior) end have generally proved satisfactory with sea bass. As best illustrated in FIG. 4, the opening in the end of the muzzle 12 nearest bait well 17 should be somewhat smaller than the opening in the muzzle's opposite (exterior) end, again depending on the specific catch to be trapped.

Enclosure means 18 may be of any convenient size and may consist of any suitable fishing grade net material, preferably nylon, bearing in mind that periodic treatment in net dip promotes longer net life and that the larger the trap the heavier the gauge of the net desirable. Good results have been obtained when the volume of netting 18 exceeds that of base 10 by a ratio of approximately 3 to 1. A size 18 nylon netting with 1¾ inch stretch has given good results with a base approximately 22 inches square.

The trap is transported in collapsed condition, typically by boat, to the location where it is to be set. Bait well 17 is filled as completely as possible; and the trap is thrown overboard, whereupon enclosure means 18 opens in response to buoyancy means 19, causing a parachute like effect whereby the bottom of the trap comes to rest on the underwater floor. After deployment, the trap may be left for any reasonable time, depending on the weather, location and particular trap size chosen. However, it should advantageously be at least checked once approximately 30 minutes after deployment.

The trap is retrieved by means of line 20 after locating buoy 21 on the surface of the water. Because line 20 is preferably attached to base 10 (as best illustrated in FIGS. 1 and 3), the trap is preferably retrieved base first, thus better dispersing the forces exerted during retrieval while simultaneously forcing the catch into position nearest across means 13 for subsequent removal through release of tie 14.

The present invention has proved satisfactory with crabs as well as with both salt water and fresh water fish. There is no apparent reason why it should not also prove satisfactory with lobsters. Additionally, this invention may be embodied in other specific forms without departing from the spirit thereof. Thus the presently disclosed embodiment is to be considered in all respects as illustrative and not restrictive, the scope of the invention being indicated by the appended claims; and all changes which may come within the meaning and range of equivalency of the claims are therefore to be deemed as embraced therein.

I claim:

1. A trap for fish, crabs and the like, characterized by a substantial portion thereof being flexible and collapsible for increasing capacity while facilitating storage and handling comprising:
    (a) a substantially rigid base adapted to rest on an underwater floor, said base defining a compartment;
    (b) buoyant flexible enclosure means secured to said base and communicatively cooperating with the compartment defined by said base when under water to form an enclosure of substantially greater volume than said compartment, said buoyant flexible enclosure means comprising a net and buoyancy means secured to said net;
    (c) bait holding means carried by said base and disposed within the compartment thereof;
    (d) entry means in said enclosure for entrance of fish, crabs and the like and comprising a muzzle carried by said base and a hole in said net communicatively cooperating with said muzzle; and
    (e) trap location and retrieval means attached to said enclosure whereby the trap may be left under water and later retrieved.

2. A trap for fish, crabs or the like, characterized by a substantial portion thereof being flexible and collapsible for increasing capacity while faciliating storage and handling, comprising:
    (a) a base adapted to rest on an underwater floor, said base comprising a substantially rigid open frame defining a compartment;
    (b) buoyant flexible enclosure means including a net and at least one buoy attached thereto, said enclosure means enveloping said base and cooperating therewith to expand generally upwardly while under water and form an enclosure of substantially greater volume than that defined by said compartment;
    (c) bait holding means supportively carried by a medial portion of said base within the compartment thereof;
    (d) bait access means in a lower portion of said enclosure for baiting said bait holding means;
    (e) means in said enclosure within said compartment for entrance of fish, crabs or the like;
    (f) cath removal access means in an upper portion of said enclosure generally opposite said base for removing fish, crabs and the like; and
    (g) means, including a line and a buoy, attached to said base for locating and retrieving the trap.

* * * * *

UNITED STATES PATENT AND TRADEMARK OFFICE
CERTIFICATE OF CORRECTION

PATENT NO. : 4,177,601

DATED : December 11, 1979

INVENTOR(S) : Roger H. Morton

It is certified that error appears in the above-identified patent and that said Letters Patent are hereby corrected as shown below:

Column 3, line 62, "across" should read --access--

Column 4, line 58, "cath" should read --catch--

Signed and Sealed this

Twenty-sixth Day of May 1981

[SEAL]

Attest:

RENE D. TEGTMEYER

*Attesting Officer*  *Acting Commissioner of Patents and Trademarks*